United States Patent [19]

Ch'Hayder et al.

[11] Patent Number: 5,063,788

[45] Date of Patent: Nov. 12, 1991

[54] PROCESS FOR PRODUCING SENSORS FOR MEASURING SPATIAL FORCES AND SENSORS OBTAINED

[75] Inventors: Ameur Ch'Hayder, Gabes, Tunisia; Didier Durand; Constantino Diaz, both of Toulouse, France

[73] Assignee: Logabex S.A.R.L., Toulouse, France

[21] Appl. No.: 460,349

[22] PCT Filed: Nov. 14, 1988

[86] PCT No.: PCT/FR88/00559

§ 371 Date: May 11, 1990

§ 102(e) Date: May 11, 1990

[87] PCT Pub. No.: WO89/04469

PCT Pub. Date: May 18, 1989

[30] Foreign Application Priority Data

Nov. 13, 1987 [FR] France ............... 87 16134

[51] Int. Cl.$^5$ ............... G01L 1/22; G01L 5/16
[52] U.S. Cl. ............... 73/862.04
[58] Field of Search ........ 73/862.04, 862.06, 862.35, 73/862.65, 862.05; 338/5

[56] References Cited

U.S. PATENT DOCUMENTS 4,094,192  6/1978  Watson et al. .
4,196,337  4/1980  Jewett et al. .

FOREIGN PATENT DOCUMENTS 0156073  10/1985  European Pat. Off. .
62-63827  3/1987  Japan .
1185128  10/1985  U.S.S.R. .

Primary Examiner—Charles A. Ruehl
Attorney, Agent, or Firm—Harold H. Dutton, Jr.

[57] ABSTRACT

The invention relates to a sensor for measuring three components of force and three components of moment. This sensor is comprised of one unitary mechanical piece comprising two end faces (1, 2) able to be secured respectively to a body generating forces and moments and to a reference body, and a central portion (7) comprising six beams (8) provided with means (12) for measuring deformations, arranged according to a closed triangular architecture between the two end faces (1, 2).

6 Claims, 3 Drawing Sheets

PROCESS FOR PRODUCING SENSORS FOR MEASURING SPATIAL FORCES AND SENSORS OBTAINED

The present invention relates to a process for producing sensors for measuring spatial forces, that is, rigid mechanical structures which, when they are interposed between two bodies, permit measurement of the torque between these two bodies, the torque being comprised of three components of force and three components of moment exerted by one body on another. It also relates to sensors obtained by carrying out this process.

The invention finds application in the fields of robotics, machine tools and in a general manner, in any industry when measuring forces and couples transmitted between two pieces.

Principal known apparatus of this type comprises several pieces assembled together by securing members, the assembly bordering on a complex mechanical structure and requiring high quality manufacturing.

Such sensors are particularly described in patents SU 1,185,128, FR 2,529,333 and JP -A- 5263827 providing wrist bands for the detection of six components of force, and patents EP 0,156,073 and U.S. Pat. No. 4,196,337 providing cuffs for the detection of three force components.

To overcome these disadvantages, another process comprises providing sensors for measuring three components of torque as described in U.S. Pat. No. 4,094,192, comprising three beams and produced by removal of material from a single starting piece. However, this type of process has been limited, as described in the preamble of U.S. Pat. No. 4,196,337, to sensors provided with three or four beams.

The present invention provides a sensor of this type produced by removal of material from a single starting piece and has as an essential object to provide a sensor for measuring three components of force and three components of moment, permitting providing very homogeneous measurements Another object is to provide a very compact sensor permitting measuring very high forces.

To this end, the invention relates to a process for production of a sensor for measuring three components of force and three components of moment, characterized in that it comprises:

machining, by removal of material, a mechanical piece having the shape of a sleeve of a generally rounded transverse shape, provided with a peripheral wall of a given thickness, in such a manner as to obtain, firstly, a sleeve having on its greatest length, a central portion of a thickness less that the initial thickness, and two end portions of the same thickness as the initial thickness, secondly, hollowing out the central portion in such a manner as to provide six beams connecting the end portions and having longitudinally a helical shape, said beams being arranged according to a closed, triangular architecture, and providing each of the beams with means for measuring their deformation.

The invention thus permits provision of a sensor from a single starting piece, by removals of material from predetermined places of this piece. This process therefor does not resemble any assemblage and permits also the provision of the sensors of various shapes, as functions of the cross-section of the single starting piece: circular, hexagonal, . . .

In addition to its economic interest, such a process permits obtaining a sensor having fundamental advantages during use. In effect, the sensor produced has great rigidity enabling measurement of high forces. Further, the beams being precisely set in place and the sensor being produced from a single piece of material, permits carrying out very homogeneous measurements.

Further, the helicoidal form of the beams providing a sensor having a better sensitivity, since due to their curvature, the beams are subjected not only to tensile-compressive stresses, but also to flexural stresses.

As a function of the applications thereof, the sensor may be produced either from a straight casting or from a casting which is longitudinally bent in such a manner as to obtain parallel end portions or extending along secant planes.

The invention also relates to a sensor obtained by carrying out this process and is characterized in that it comprises a one piece mechanical element having two end faces adapted to be secured respectively to a body generating forces and moments, and to a reference body, and a central portion composed of six beams provided with means for measuring deformations, and arranged according to a closed triangular architecture between the two end faces.

The thus sensor comprises a central part composed of six beams arranged according to a triangular architecture and two end faces comprising means for securing to the force and moment generating body and to the reference body. Thus, it constitutes a single mechanical piece, the provision of which is not made apparent from any assemblage of parts.

During use of this sensor, one end face thereof is fixed to a body generating forces and moments, and the other end face to a reference body. The three components of forces and of moments are thus transmitted from one body toward the other through the sensor, and in particular through its central framework portion.

The application of the three components of force and moment to one end fact of the sensor generates, because of the triangular arrangement of the beams, forces being exerted at the level of each of the connections to the housing of each beam. These forces, having the same intensity, and different directions, cause a deformation of the beams.

Measuring means such as strain gauges fixed in the central region of each beam, deliver an electric signal as a function of the deformation of the beam.

The adaptation of this sensor to a given application is achieved by an appropriate choice of dimensions of the sensor body as well as its cross section, the length and inclination of the beams forming the central framework.

The mechanical structure of this sensor being rigid, it can measure high forces.

Other characteristics, objects and advantages of the invention will become apparent from the detailed description which follows and from a consideration of the accompanying drawings which show, by way of non-limiting example, one preferred embodiment. In these drawings which form an integral part of the present description:

Figure 1:
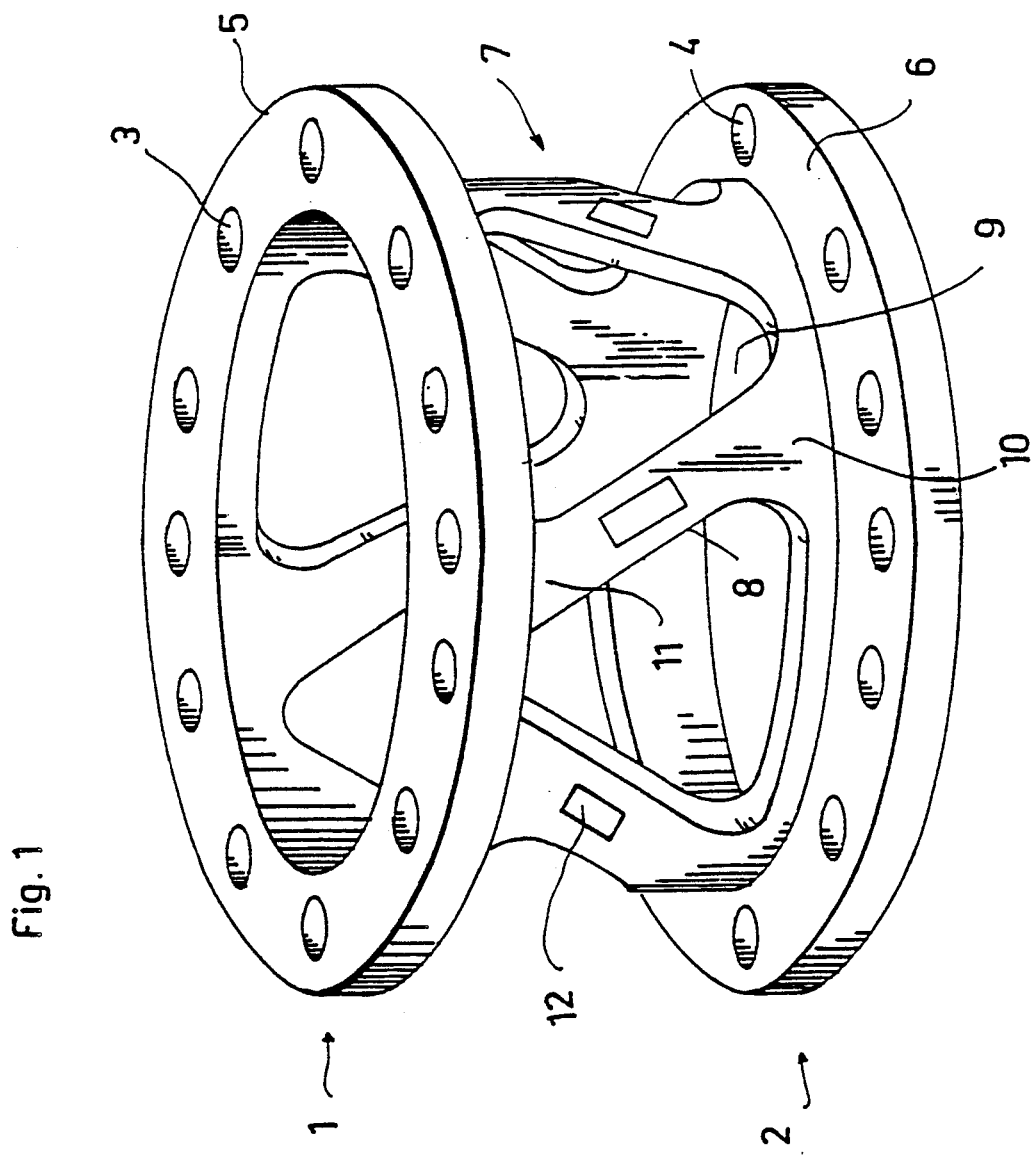
FIG. 1 is a perspective view of the sensor.
Figure 2:
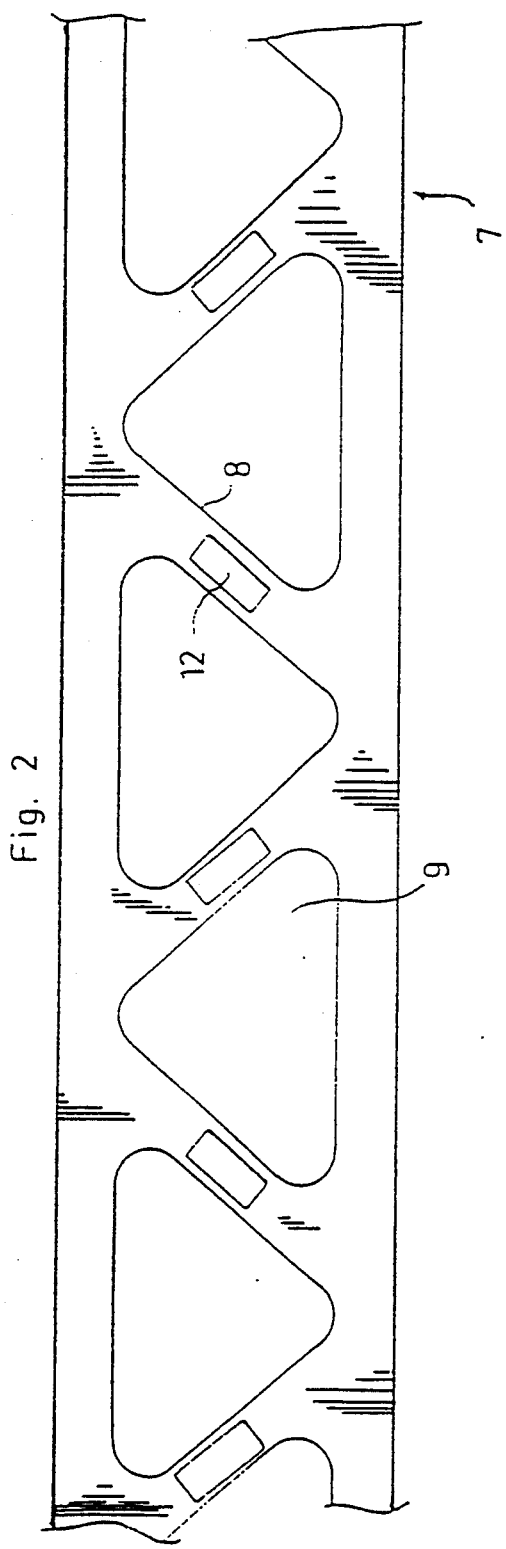
FIG. 2 is an expanded plan view of the central portion of the sensor.

The sensor shown in FIG. 1 is provided with two end faces 1 and 2 having the shape of rings 5, 6 permitting securing the sensor to bodies between which are to be measured the components of force and moment. These two end faces 1, 2 are provided with securing means, in the example holes 3 and 4, arranged axially in the rings 5, 6.

The central portion of the sensor, in a cylindrical shape, presents itself in the shape of a spatial framework 7 formed of beams 8 secured by connections to the housing 10, 11 to the end faces 1, 2 and having a helical shape in the longitudinal direction. These beams 8 are produced by the removal of material in the places 9 of this central portion of the sensor. They are distributed uniformly about the primary axis of the sensor and arranged according to a closed, angular architecture in such a manner as to extend from three distinct zones from one of the end faces 1 of the sensor to three distinct zones of the other end face 2 spaced axially by 60 with respect to the three zones.

The components of force and moment exerted on one end face 1, 2 of the sensor generate opposing forces between the two connection zones 10, 11 of each beam 8 and as a result deform the same.

The deformation is measured on each beam 8 by a strain gauge 12 which delivers an electric signal as a function of the deformation of the beam.

Because of the framework structure of the sensor, the following relationship may be written between the components of torque to be measured (Fx, Fy, Fz, Mx, My, Mz) and the forces exerted on the beams 8 of the sensor (F1, F2, F3, F4, F5, F6):

$$\begin{bmatrix} Fx \\ Fy \\ Fz \\ Mx \\ My \\ Mz \end{bmatrix} = \begin{bmatrix} m11 & m12 & m13 & m14 & m15 & m16 \\ m21 & m22 & m23 & m24 & m25 & m26 \\ m31 & m32 & m33 & m34 & m35 & m36 \\ m41 & m42 & m43 & m44 & m45 & m46 \\ m51 & m52 & m53 & m54 & m55 & m56 \\ m61 & m62 & m63 & m64 & m65 & m66 \end{bmatrix} \cdot \begin{bmatrix} F1 \\ F2 \\ F3 \\ F4 \\ F5 \\ F6 \end{bmatrix}$$

The forces F1 to F6 generate a deformation of the beams 8: $\epsilon_1, \epsilon_2, \epsilon_3, \epsilon_4, \epsilon_5, \epsilon_6$ which are measured by means of the deformation sensors 12.

The relationship between the forces F1 to F6 and the deformations $\epsilon_1$ to $\epsilon_6$ is:

$$\epsilon_i = K_i F_i$$

When the beams 8 are identical, the terms Ki are identical.

The function which relates the electric signals $\mu_1$ to $\mu_6$ which are received to the deformations $\epsilon_1$ to $\epsilon_6$ is:

$$\mu_i = G_i \epsilon_i$$

When the gauges 12 are identical, the terms Gi are identical. As a result, we have a relationship between the signals which are received and the forces in the beams:

$$\mu_i = G_i \times K_i \times F_i$$

and:

$$F_i = \frac{\mu_i}{G_i \times K_i}$$

and therefor the relationship between the signals which are received and the torque to be measured will be:

$$\begin{bmatrix} Fx \\ Fy \\ Fz \\ Mx \\ My \\ Mz \end{bmatrix} = \begin{bmatrix} q11 & q12 & q13 & q14 & q15 & q16 \\ q21 & q22 & q23 & q24 & q25 & q26 \\ q31 & q32 & q33 & q34 & q35 & q36 \\ q41 & q42 & q43 & q44 & q45 & q46 \\ q51 & q52 & q53 & q54 & q55 & q56 \\ q61 & q62 & q63 & q64 & q65 & q66 \end{bmatrix} \cdot \begin{bmatrix} \mu_1 \\ \mu_2 \\ \mu_3 \\ \mu_4 \\ \mu_5 \\ \mu_6 \end{bmatrix}$$

The terms q,i,j are identified by, for example, subjecting the sensor to unitray constraints according to each component.

When the sensor is placed on a robot, one end is fixed to a wrist of the robot, and the other end to the terminal.

Figure 3:
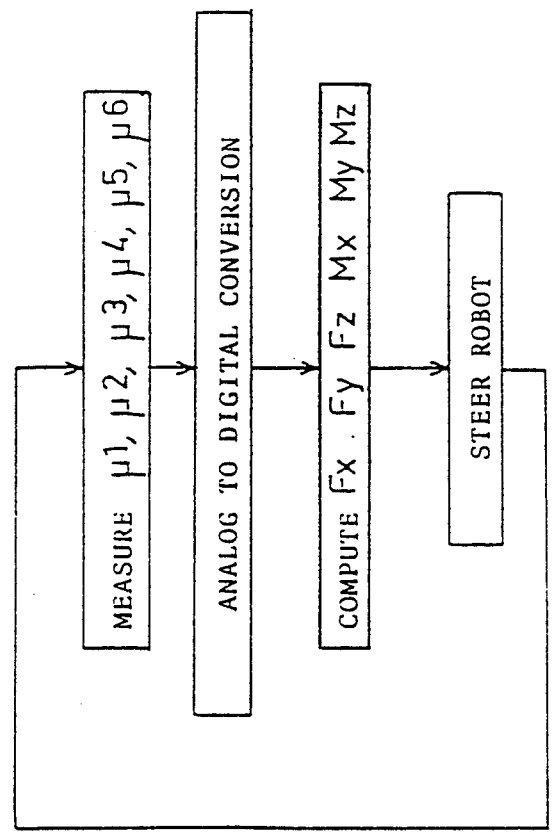
FIG. 3 shows a block diagram of the measurements provided from the six beams of the sensor.
Figure 4:
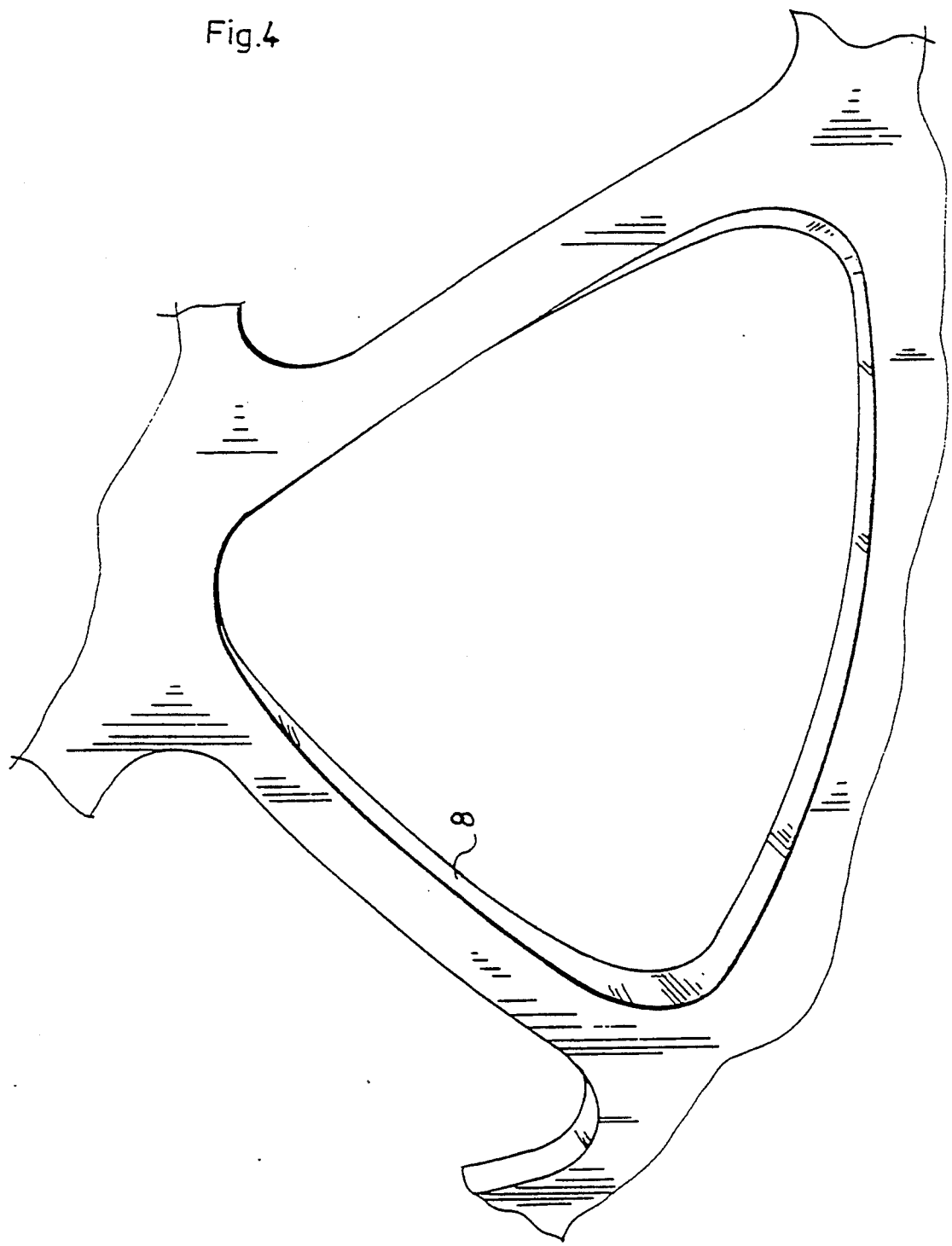
FIG. 4 is a partial perspective view on an enlarged scale of the central portion of the sensor.

One may then use the force data delivered by this sensor for controlling the robot. The analog signals are converted to digital signals and send to the computer controlling the robot (FIG. 3).

We claim:

1. A process for the production of a sensor for measuring three components of force and three components of moment, comprising
   working, by removal of material, a mechanical piece having the shape of a sleeve of a generally rounded cross-sectional shape and a peripheral wall of a given thickness, in such a manner as to obtain substantially simultaneously a sleeve having, over its greatest length, a central portion (7) of a thickness less than the initial thickness, and two end portions (1, 2) of the same thickness as the initial thickness,
   hollowing out said central portion (7) in such a manner as to produce six beams (8) connecting said end portions (1, 2) and having longitudinally a helical shape, said beams being arranged according to a closed triangular architecture, and
   providing each of the beams (8) with means (12) for measuring their deformation.

2. A process for producing a measuring sensor as in claim 1, and wherein said sleeve comprises a rectilinear sleeve so as to obtain two parallel end portions (1, 2).

3. A sensor for measuring three components of force and three components of moment comprising a unitary mechanical piece having a generally rounded transverse cross-section and comprising two end faces (1, 2) able to be secured respectively to a body generating forces and moments and to a reference body, and a central portion (7) composed of six beams (8) having longitudinally a helical shape, provided with means (12) for measuring the deformations and arranged according to a closed triangular architecture between the two end faces (1, 2).

4. A measuring sensor as in claim 3, and wherein said end faces (1, 2) are parallel.

5. A sensor as in one of claim 3, in which the beams (8) define a regular framework and extend from three distinct zones of one of the end faces (1) of the sensor to three distinct zones of the other end face (2), spaced axially by 60° with respect to the aforesaid three zones.

6. A sensor as in one of claim 3, in which the means for measuring the deformation of the beams (8) comprises strain gauges (12).

* * * * *